United States Patent [19]
Heisel et al.

[11] Patent Number: 5,439,664
[45] Date of Patent: Aug. 8, 1995

[54] PROCESS FOR THERMAL CONVERSION OF HYDROGEN SUFIDE TO ELEMENTAL SULFUR

[75] Inventors: Michael Heisel, Pullach; Freimut Marold, Ottobrunn, both of Germany

[73] Assignee: Linde Aktiengesellschaft, Wiesbaden, Germany

[21] Appl. No.: 905,567

[22] Filed: Jun. 29, 1992

[30] Foreign Application Priority Data

Jun. 27, 1991 [DE] Germany .................. 41 21 290.8

[51] Int. Cl.6 .................. C01B 17/04; B01D 53/48
[52] U.S. Cl. .................. 423/567.1; 423/574.1; 423/576.8; 423/222; 423/224; 423/242.1
[58] Field of Search .................. 423/222, 224, 243.03, 423/244.05, 574 R, 576.8, 574.1, 574.2, 567.1, 242.1

[56] References Cited

U.S. PATENT DOCUMENTS

| | | | |
|---|---|---|---|
| 3,851,050 | 11/1974 | Groenendaal et al. | 423/222 |
| 4,552,747 | 11/1985 | Goar | 423/574 R |
| 4,632,819 | 12/1986 | Fischer et al. | 423/574 R |
| 4,844,881 | 7/1989 | Gens et al. | 423/574 R |
| 5,028,409 | 7/1991 | Gitman | 423/574 R |
| 5,262,135 | 11/1993 | Lell et al. | 423/220 |

FOREIGN PATENT DOCUMENTS

| | | | |
|---|---|---|---|
| 0234894 | 9/1987 | European Pat. Off. | |
| 0252497 | 1/1988 | European Pat. Off. | 423/574 R |
| 0270223 | 6/1988 | European Pat. Off. | |
| 0325287 | 7/1989 | European Pat. Off. | 423/224 |
| 3628358 | 2/1988 | Germany . | |
| 2117749 | 10/1983 | United Kingdom . | |

OTHER PUBLICATIONS

"W-L SO2 recovery" licensed to Davy McKee Hydrocarbon Processing; Apr. 1982; p. 122.

*Primary Examiner*—Wayne Langel
*Assistant Examiner*—Timothy C. Vanoy
*Attorney, Agent, or Firm*—Millen, White, Zelano & Branigan

[57] ABSTRACT

For the thermal conversion of hydrogen sulfide contained in a gaseous stream, the gaseous stream is introduced into a non-catalytic reactor together with sulfur dioxide obtained from a waste gas purification facility arranged downstream of the reactor. If necessary, the sulfur yield can be regulated by feeding additional fuel gas and/or reducing gas and/or process air into the reactor. The thus-produced vapor-phase sulfur is condensed out by cooling and is obtained as a product; the resultant gaseous stream extensively freed of sulfur compounds is discharged and fed into the aforesaid downstream waste gas purification facility.

23 Claims, 1 Drawing Sheet

PROCESS FOR THERMAL CONVERSION OF HYDROGEN SUFIDE TO ELEMENTAL SULFUR

BACKGROUND OF THE INVENTION

The invention relates to a process for the thermal conversion of hydrogen sulfide, contained in a gaseous stream, with sulfur dioxide to elemental sulfur wherein the gaseous stream containing hydrogen sulfide is introduced into the reactor together with sulfur dioxide obtained from a waste gas purification facility arranged downstream of the reactor. The thus-produced vapor-phase sulfur is condensed out by cooling and obtained as a product, and the gaseous stream extensively freed of sulfur compounds is discharged and fed into a downstream waste gas purification facility.

One process step frequently necessary in the processing of raw gas streams is the separation of sour gases, essentially $CO_2$, $H_2S$ and mercaptans. This separation can be conducted by various techniques, for example by adsorption or scrubbing. In this connection, it is of special advantage to remove the carbon dioxide and the sulfur-containing sour gases separately from the raw gas streams. Suitable for this purpose are chemical as well as physical scrubbing processes, the latter, in particular, being preferred, especially where the raw gas streams have a high $CO_2$ content. The residual fraction obtained, for example, in an $H_2S$-selective scrubbing operation and enriched with $H_2S$ contains usually between 25 and 90 mol-% of $H_2S$, depending on the hydrogen sulfide content of the gaseous stream to be cleaned.

It has been known for a long time that sulfur can be obtained from a gaseous stream thus enriched with $H_2S$. This can take place, for example, in accordance with a sulfur-producing facility (Claus plant) based on the Claus reaction

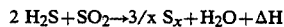

$$2\,H_2S + SO_2 \rightarrow 3/x\,S_x + H_2O + \Delta H$$

(wherein $x = 1, 2, 3, 4, 5, 6, 7$ or $8$).

Heretofore, the use of a catalyst has been indispensable in sulfur production plants on an industrial scale. The advantages of the catalyst reside in its activity at lower temperatures permitting high sulfur yields by virtue of improved equilibrium conditions at low temperatures. With corresponding initial outlay, the yields of sulfur are limited to about 99.5 mol-%. A substantial drawback of these methods, however, lies in the sensitivity of the catalysts employed—especially in processes designed for maximum yield. More specifically, certain chemical compounds which occur with relative frequency in the feed gases, such as, for example, ammonia compounds, can lead to clogging and an accompanying rapid deactivation of the catalyst. Also any traces of oxygen bring about sulfating and catalyst deactivation.

DOS 3,403,651 discloses a special process for the catalytic conversion of hydrogen sulfide contained in a gaseous stream to elemental sulfur by using sulfur dioxide. For this purpose, the preheated gaseous stream is conducted for conversion purposes over a catalyst bed wherein a temperature is maintained of 125°–450° C. The thus-formed vapor-phase sulfur is condensed out by cooling, and the gaseous stream, extensively freed of sulfur compounds, is exhausted to the atmosphere. For maximizing the sulfur yield, the gaseous stream is passed over the bed in a way entailing only minimum pressure losses. Furthermore, the catalyst bed is cooled internally by a cooling medium. Based on this mode of operation, the sulfur yield can be increased to close to the theoretically maximum possible value.

Several other variations of the Claus process are known wherein the conversion of the gaseous stream containing hydrogen sulfide to elemental sulfur takes place by catalytic methods. These catalytic conversion processes required a very closely maintained stoichiometry as a pre-condition for achieving high yields. However, under practical circumstances, the quantity, as well as the composition of the feed gas, fluctuate so that the the optimum operating point, is frequently missed and the theoretically possible yield cannot be attained.

Catalyst beds charged with sulfur are also susceptible to fire; for this reason, the feed gas stream must be kept free of oxygen. Since the feeding and discharge operations cannot be performed with sour gas, natural gas is used instead. The latter is burned close to stoichiometry in order to be able to provide a maximally oxygen-poor and hot inert gas for the sulfur production plant. Only in this way is it possible to prevent oxygen from passing into the reactors wherein the accumulated sulfur otherwise would burn, in case of oxygen introduction, spontaneously with a very hot flame which would lead to extensive damage.

SUMMARY OF THE INVENTION

Therefore, an object of the present invention is to provide an improved process of the type discussed hereinabove.

Another object is to provide a process requiring lower investment and operating costs.

A further object is to provide a plant having simplified process technology.

Still another object is to provide a process capable of achieving a marked reduction of pollutant emission, not only with respect to the emission of sulfur compounds but also with respect to carbon dioxide exhaust, in particular.

Upon further study of the specification and appended claims, further objects and advantages of this invention will become apparent to those skilled in the art.

To attain such objects according to this invention, the conversion of the gaseous stream containing hydrogen sulfide with sulfur dioxide to elemental sulfur, and the production of a gaseous stream extensively freed of sulfur compounds, is conducted in at least one exclusively thermally-operated reactor, i.e., a non-catalytic reactor.

The invention is thus based on the utilization of thermal conversion in place of the heretofore customary catalytic conversion for converting gaseous streams containing hydrogen sulfide to elemental sulfur.

The avoidance of the use of a catalyst results in a lowering of the initial outlay and operating costs as well as in a simplified operation of the sulfur production plant from the viewpoint of process technology.

The process according to this invention permits an almost optimal utilization of the chemical energy contained in the feed gas stream. The hydrogen sulfide contained in the feed gas stream reacts with the sulfur dioxide recycled from the waste purification facility arranged downstream of the reactor, in the combustion chamber of the reactor at a temperature of between 800° and 1600° C. to elemental sulfur and water. Thereby, sulfur yields of above 70% can be attained. The calorific value of the remaining, unconverted components is still so high in the process of this invention that feeding of additional fuel gas in the subsequent thermal oxidation of the remaining sulfur compounds either can be entirely omitted or at least can be substantially reduced.

The total yield of elemental sulfur will not suffer, in spite of the comparatively low yield of sulfur at the outlet of the reactor, since, in the downstream waste purification facility, a correspondingly larger quantity of sulfur dioxide can be obtained and can be recycled to upstream of the reactor.

The fact that heating gas can be dispensed with considerably reduces the amount of inert gas to be treated in the waste gas purification facility. This is because the formation of carbon dioxide, produced from the combustion of heating gas (conventionally carbon-containing gases), is substantially diminished.

For this reason, the sulfur dioxide scrubber can likewise be constructed of smaller dimensions since the determining design criterion, namely the amount of scrubbing agent circulated, is proportional, as a first approximation, to the quantity of inert gas.

In conventional sulfur production plants, large amounts of low-pressure steam are obtained since stepwise catalysis and sulfur condensation take place, on the one hand, at a relatively low temperature level since this is the more favorable operating range of the catalyst and, on the other hand, maximum sulfur condensation occurs in the proximity of the sulfur solidification point whereby the steam pressure is normally fixed at most 4.5 bar, minimally at 2.0 bar. In contrast thereto, the process of this invention operates at substantially higher temperatures—up to 1600° C.—whereby it is possible to obtain a larger quantity of heated or superheated high-pressure steam than obtained in conventional Claus plants. This high-pressure steam is obtained, in the process according to the invention, from boiler feed water in the waste heat boiler of the reactor.

Low-pressure steam is obtained in the sulfur production plant. As has been the case heretofore—this steam can be utilized for the regeneration of the loaded scrubbing medium in the downstream waste gas purification facility—but the proportion of high-pressure to low-pressure steam quantity in the present invention is improved by a multiple.

The avoidance of the use of a catalyst also permits the processing of contaminated gases. Thereby, a preliminary cleaning of the feed gas stream, otherwise necessary and expensive, can be omitted so that the pressure losses incurred by the preliminary cleaning and passage through the catalyst are avoided. This saves, in turn, the need for compressors between the individual parts of the plant, as required in the known processes.

Furthermore, the use of catalysts causes troublesome and undesirable secondary reactions in sulfur production plants. One example is the formation of COS/CS$_2$ in the thermal stage of a Claus plant. COS/CS$_2$, once formed, can drastically impair the sulfur yield under certain circumstances. Decomposition of COS/CS$_2$ is possible in the catalysis only by increasing the temperature level to at least 330° C., but this decreases the sulfur formation rate in accordance with the Claus reaction. In the process according to this invention, COS and CS$_2$ do not result in a similar reduction in the yield of sulfur. Although these compounds are likewise formed, as in the conventional methods, their conversion to sulfur dioxide takes place to almost 100% during combustion in the downstream waste gas purification facility.

In one embodiment of the process according to this invention, fuel gas is introduced into the reactor in addition to the feed gas stream containing hydrogen sulfide and in addition to the sulfur dioxide recycled from the subsequently arranged waste gas purification facility. The fuel gas utilized can comprise natural gas, refinery gas or sour water stripper gas which, if desired, can be decomposed in any desired way before entering the reactor, for example, to N$_2$, H$_2$, H$_2$S and H$_2$O.

This additional feeding of fuel gas can be employed, especially in those cases where the temperature level in the combustion chamber of the reactor is still too low for a satisfactory non-catalytic conversion of hydrogen sulfide and sulfur dioxide to elemental sulfur and water. Under certain circumstances, especially with a low concentration of hydrogen sulfide in the feed gas, the sulfur yield in the reactor can drop to below ⅔ of the sulfur content in the feed gas stream so that sulfur dioxide would accumulate in the circulation of reactor/waste gas purification facility. In this case, by means of a substoichiometric combustion of the fuel gas, a hot, reducing gas atmosphere is generated so that additional sulfur dioxide is reduced whereby the aforedescribed Claus reaction can occur under correct, stoichiometric conditions. As representative of a number of possible typical reactions, the following is exemplified:

$$SO_2 + 3\,H_2 \rightarrow H_2S + 2\,H_2O \text{ or}$$

$$2\,SO_2 + CH_4 \rightarrow S_2 + 2H_2O + CO_2$$

Another embodiment of the process according to this invention comprises establishing an oxidizing atmosphere in a first stage of the reactor and, in a second stage of the reactor, a reducing atmosphere which is of advantage, in particular, when combusting NH$_3$. For only at high temperatures (>1300° C.) and with excess O$_2$ is it possible to reliably achieve a complete conversion of NH$_3$. Feeding of H$_2$S and SO$_2$ then takes place in the second stage of the reactor so that a reducing atmosphere is established.

A further version of the process of this invention provides for the feeding of a reducing gas into the reactor. Hydrogen and methane are exemplified as representative for the almost incalculable group of these gases.

The introduction of process air into the reactor, provided in further embodiments of the invention, facilitates the regulation of the process stoichiometry within the reactor whereby, in the final analysis, the yield of elemental sulfur is determined.

Other embodiments of the process according to this invention provide for preheating of the process air as well as for enriching this process air with oxygen. The oxygen concentration in the oxygen-enriched process air ranges between 21 and 100 mol-%, preferably between 30 and 60 mol-%.

A further embodiment of the process of this invention comprises cooling the thus-formed elemental sulfur and the gaseous stream freed of sulfur compounds in a waste heat boiler of the reactor against boiler feed water. During this step, formation and optimum superheating of process steam take place; this steam can be utilized within the sulfur production plant, be it for heating gaseous streams or for introduction into the combustion chamber of the reactor for reduction of soot formation. The superheated steam can also be subjected to engine expansion by means of expansion turbines, with the production of energy. The reaction chamber temperatures of the reactor in the process according to this invention range between 800° and 1600° C., preferably between 900° and 1300° C.; and in the flame proper, markedly higher temperatures can prevail.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 41 21 290.8, are hereby incorporated by reference.

BRIEF DESCRIPTION OF THE DRAWING

Various other objects, features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION OF THE DRAWING

Figure 1:
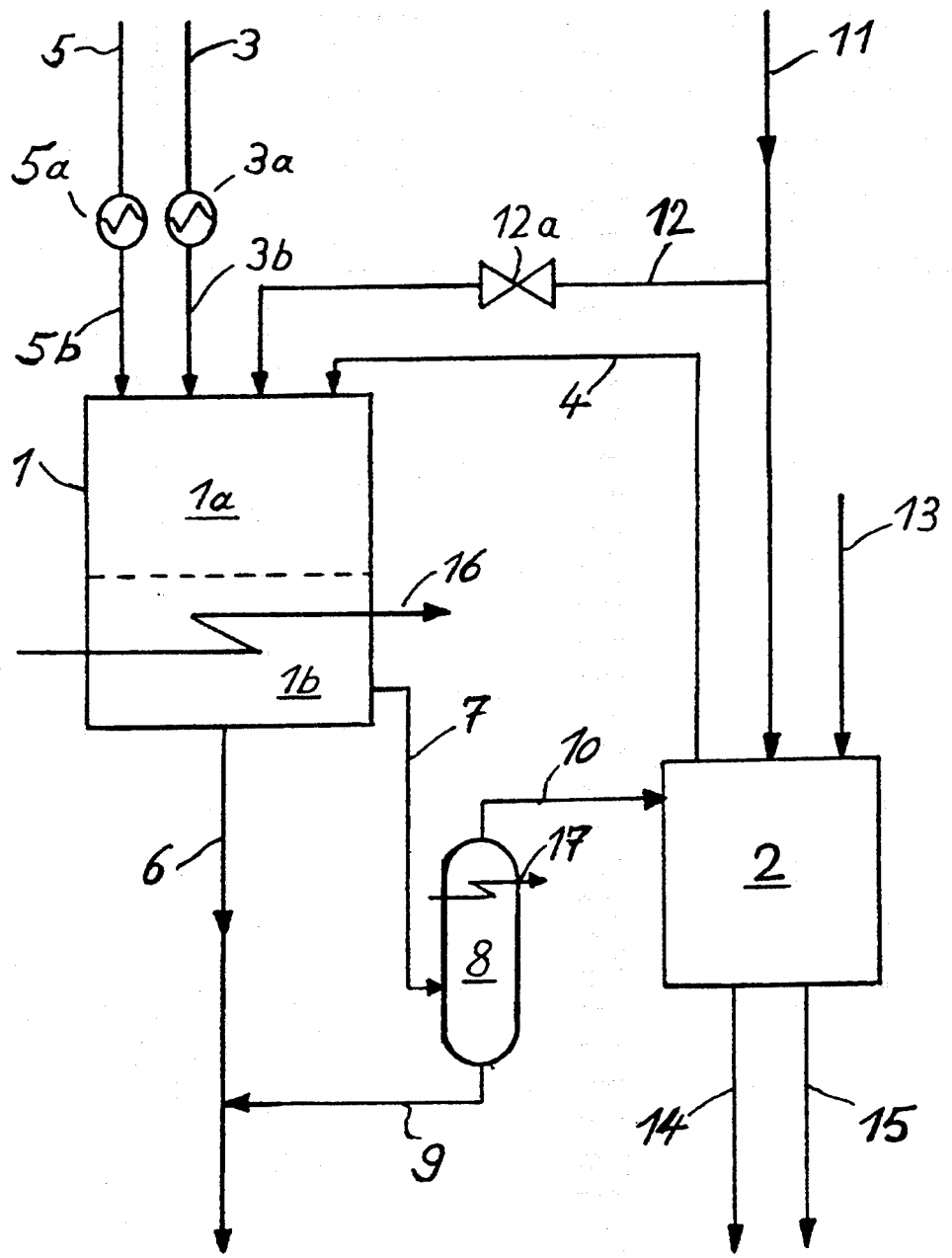
FIG. 1 is a schematic flowsheet of a preferred comprehensive embodiment of the invention.

In this description, all quantitative data, unless indicated otherwise, are in volume percent.

The non-catalytic thermally operated reactor 1 shown in FIG. 1 consists essentially of the combustion chamber 1a proper and a waste heat boiler 1b. The waste gas purification facility 2, arranged downstream of the thermally operated reactor 1 and the condenser 8, described below, are shown here schematically; however, the structure as well as mode of operation of this waste gas purification facility will be dependent, under practical conditions, on the corresponding specifications with respect to elemental sulfur yield, waste gas data, etc. In this embodiment, the facility is comprised of an afterburning stage for the gaseous stream of the reactor, partially depleted of sulfur compounds, with a subsequent sulfur dioxide scrubbing stage.

Via conduit 3, a pressurized feed gas containing hydrogen sulfide is introduced, with the following composition, expressed in volume percent:

| | |
|---|---|
| $H_2S$ | 89 |
| $CO_2$ | 5 |
| $CH_4$ | 5 |
| Other components | 1 |
| $H_2O$ | Saturated |

This gaseous mixture is heated to 350° C. in heat exchanger 3a against process steam to be cooled and conducted via conduit 3b into the combustion chamber 1a of the thermally operated reactor 1. The combustion chamber temperature is 1130° C. and combustion takes place under a pressure of 1.4 bar.

Via conduit 4, highly concentrated, pressurized sulfur dioxide (sulfur dioxide concentration≈90 mol-%), obtained by scrubbing the incinerated gas from the sulfur condenser 8 during the post-purification of the waste gas containing sulfur compounds, is conducted from the waste gas purification facility 2 into the combustion chamber 1a. The temperature of the gaseous sulfur dioxide is 45° C. upon entrance into the combustion chamber 1a. Via conduit 5, pressurized process air is conducted to the heat exchanger 5a, heated therein to 70° C. against process steam to be cooled, and likewise passed into the combustion chamber 1a by way of conduit 5b. Oxygen enrichment of process air is optional but is not illustrated for the sake of clarity.

Condensing out the vapor-phase sulfur then takes place in the waste heat boiler 1b of the thermal reactor 1 by cooling; this sulfur is then obtained as a product stream by means of conduit 6 with a sulfur concentration of 99.9 vol-% and at a temperature of 300° C. The heat liberated in the waste heat boiler 1b is utilized for generating and superheating high-pressure steam from boiler feed water. This boiler feed water is conducted into the waste heat boiler 1b via conduit 16 and leaves the boiler by way of conduit 16 as superheated high-pressure steam which can serve, in turn, for heating the streams in conduit 3 and/or conduit 5.

The gaseous stream withdrawn via conduit 7, partially free of sulfur compounds, fed, under pressure, at a temperature of 300° C. to a condenser 8, has the following composition, expressed in volume percent:

| | |
|---|---|
| $SO_2$ | 6 |
| $H_2S$ | 10 |
| $S_{6+}$ | 6 |
| $H_2O$ | 35 |
| $N_2$ | 35 |
| $CO_2$ | 4 |
| $H_2$ | 3 |
| Other components | 1 |

After cooling to 140° C., a second product stream having a sulfur concentration of 99.9 vol-% is discharged via conduit 9 and combined with the product stream in conduit 6.

The heat released in condenser 8 is utilized for vaporizing the boiler feed water passed through the condenser in conduit 17, with production of low-pressure steam. One possibility of using the low-pressure steam is in the regeneration of the $SO_2$-loaded scrubbing agent in the waste gas purification facility 2.

Waste gas under pressure is conducted via conduit 10 into the downstream waste gas purification facility 2, said gas having a temperature of 140° C. and the following composition, expressed in volume percent:

| | |
|---|---|
| $SO_2$ | 6 |
| $H_2S$ | 10 |
| $H_2O$ | 38 |
| $N_2$ | 37 |
| $CO_2$ | 4 |
| $H_2$ | 3 |
| Other components | 2 |

Fuel gas and process air are required for the afterburning of resultant waste gas. The pressurized fuel gas in conduit 11 has the composition set out below, at a temperature of 38° C.:

| | |
|---|---|
| $CH_4$ | 35 |
| $C_{2+}$ | 37 |
| $N_2$ | 17 |
| $H_2$ | 10 |
| Other components | 1 |

A portion of this fuel gas can be passed via conduit 12 and valve 12a, if necessary, into the combustion chamber 1a of the exclusively thermally operated non-catalytic reactor 1.

Conduit 13 supplies the waste gas purification facility with pressurized process air while conduit 14 represents the wastewater conduit and conduit 15 represents the waste gas conduit to the atmosphere. The composition of the waste gas in conduit 15, exhausted into the atmosphere, is as follows, expressed in volume percent:

| | |
|---|---|
| $N_2$ | 87 |
| $O_2$ | 2 |
| $CO_2$ | 6 |
| $H_2O$ | 5 |
| $SO_2$ | <100 ppm |

In the waste gas purification facility, the waste gas is incinerated, thus converting all sulfur species into $SO_2$. The resultant gas is passed to an $SO_2$ scrubbing system, as described, e.g., in Hydrocarbon Processing, "How new tail gas treater increases Claus unit throughput", Vol 71 1991 No. 4 p. 83ff or in U.S Pat. No. 4,795,620.

In the process of the invention, there is employed preferably only the non-catalytic thermal conversion of $H_2S$ to elemental sulfur. However, in certain cases, for example, e.g., in cases of extremely fluctuating feed gas compositions, an additional catalytic stage may be useful.

Heretofore, it was appreciated that if an $SO_2$ recycle were employed for the off-gas purification (treatment of the waste gas in conduit 10), the flame temperature in a thermal reactor would drop, so that less sulfur would be formed. This in turn would increase the $SO_2$ recycle, so that the temperature in the thermal reactor would drop even further, with a still further decrease in the yield of sulfur, and further increase the $SO_2$ recycle and so on. Therefore, such a system would not have been contemplated as being a rational engineering alternative.

In the present invention, however, the use of pure $O_2$ reduces ballast $N_2$ in the thermal reactor and thus increases the flame temperature. This tends to increase sulfur formation and thus reduces the $SO_2$ recycle. Even if pure $O_2$ is not available, surplus $SO_2$ can be partially reduced to sulfur and $H_2S$ by the addition of a reducing gas, e.g., $CH_4$ or $H_2$ in order to increase the flame temperature. Fuel addition is necessary, if the feed gas is too low in $H_2S$, especially if the $H_2S$ content is lower than 70 vol.-%. Thus, the fuel serves as a heat source to maintain the desired flame temperature.

Furthermore, by taking into account all the potential reactions of all the components, e.g., $CH_4$, $NH_3$, $H_2S$ and of $O_2$, the system can be fine-tuned to ensure that surplus $SO_2$ does not build up in the cycle, and that surplus $H_2S$ is converted to sulfur.

In addition, the build-up of other components, especially of $CO_2$ and $N_2$, should be avoided in order to keep the reactor temperature sufficiently high. Thus, according to the invention, this is accomplished by separating $SO_2$ from the residual gas. The separated $SO_2$ is then recycled via conduit 4, whereas $CO_2$ and $N_2$ in the residual gas are vented through conduit 15.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the thermal conversion of hydrogen sulfide contained in a gaseous feedstream with sulfur dioxide to form elemental sulfur, comprising:
   introducing the gaseous feedstream containing hydrogen sulfide into a thermal reactor together with sulfur dioxide obtained from a waste gas purification facility arranged downstream of the reactor,
   reacting the hydrogen sulfide and sulfur dioxide thermally in said thermal reactor under non-catalytic conditions to produce a vapor phase sulfur stream and a gaseous stream partially depleted of sulfur compounds,
   condensing resultant vapor phase sulfur by cooling, and withdrawing resultant condensed sulfur as a product,
   discharging the gaseous stream partially depleted of sulfur compounds and containing residual $H_2S$ from the thermal reactor, and
   feeding said gaseous stream into the downstream waste gas purification facility to obtain said sulfur dioxide,
   wherein the process is devoid of any step downstream of said thermal reactor of catalytically converting the residual $H_2S$ in the gaseous stream to elemental sulfur.

2. A process according to claim 1, wherein fuel gas is introduced into the thermal reactor in addition to the gaseous stream containing hydrogen sulfide and in addition to the recycled sulfur dioxide.

3. A process according to claim 2, wherein the introduced fuel gas comprises natural gas, refinery gas or sour water stripper gas.

4. A process according to claim 2, wherein an oxidizing atmosphere is established in a first stage of the reactor, and a reducing atmosphere is established in a second stage of the reactor.

5. A process according to claim 2, wherein the $H_2S$ content in the gaseous feedstream is less than 70 vol %.

6. A process according to claim 1, wherein an oxidizing atmosphere is established in a first stage of the reactor, and a reducing atmosphere is established in a second stage of the reactor.

7. A process according to claim 6, wherein a reducing gas is introduced into the reactor.

8. A process according to claim 6, wherein process air is introduced into the reactor.

9. A process according to claim 8, wherein the process air is preheated before entering the reactor.

10. A process according to claim 8, wherein the process air is enriched with oxygen before entering the reactor.

11. A process according to claim 10, wherein the oxygen concentration of the oxygen-enriched process air ranges between 21 and 100 mol-%.

12. A process according to claim 11, wherein the process air is pure oxygen.

13. A process according to claim 12, wherein the gaseous stream partially depleted of sulfur compounds is incinerated to convert all sulfur compounds to sulfur dioxide, and the sulfur dioxide is scrubbed out and then passed to the thermal reactor.

14. A process according to claim 10, wherein the oxygen concentration of the oxygen-enriched process air ranges between 30 and 60 mol-%.

15. A process according to claim 14, wherein a flame zone is in the reactor and the temperature outside of the flame zone in the reactor ranges between 800° and 1600° C.

16. A process according to claim 14, wherein a flame zone is in the reactor and the temperature outside of the flame zone in the reactor ranges between 900° and 1300° C.

17. A process according to claim 1, wherein the vapor phase sulfur stream and the gaseous stream partially depleted sulfur compounds are cooled against boiler feed water to form superheated steam.

18. A process according to claim 1, wherein a flame zone is in the reactor and the temperature outside of the flame zone in the reactor ranges between 800° and 1600° C.

19. A process according to claim 1, wherein a flame zone is in the reactor and the temperature outside of the flame zone in the reactor ranges between 900° and 1300° C.

20. A process according to claim 1, wherein the gaseous stream partially depleted of sulfur compounds is incinerated to convert all sulfur compounds to sulfur dioxide, and the sulfur dioxide is scrubbed out and then passed to the thermal reactor.

21. A process according to claim 1, wherein the process is devoid of any step of catalytically converting $H_2S$ to elemental sulfur.

22. A process according to claim 1, wherein the gaseous stream partially depleted of sulfur compounds from the thermal reactor is condensed to obtain a second condensed sulfur product before being fed to the downstream waste gas purification facility.

23. A process according to claim 1, wherein the gaseous stream partially depleted of sulfur compounds from the thermal reactor has an $SO_2$ content of 6% by volume.

* * * * *